United States Patent [19]

Kivioja

[11] 4,149,321

[45] Apr. 17, 1979

[54] MERCURY LEVELING INSTRUMENTS

[76] Inventor: Lassi A. Kivioja, 60 Blackfoot Ct., Lafayette, Ind. 47905

[21] Appl. No.: 777,710

[22] Filed: Mar. 15, 1977

[51] Int. Cl.² .......................... G01C 5/00; G01C 9/18
[52] U.S. Cl. ...................................... 33/292; 356/249
[58] Field of Search .......................... 33/290, 291, 292; 356/249; 350/23

[56] References Cited

U.S. PATENT DOCUMENTS

| | | | |
|---|---|---|---|
| 921,773 | 5/1909 | Wild | 356/249 |
| 1,089,480 | 3/1914 | Korrodi | 356/249 |
| 3,807,869 | 4/1974 | Hartley | 33/291 |
| 3,905,707 | 9/1975 | Feist et al. | 356/249 |
| 3,910,704 | 10/1975 | Richarme | 356/249 |
| 3,918,813 | 11/1975 | Rossiter | 350/23 |

FOREIGN PATENT DOCUMENTS 370626  2/1907  France ...................................... 376/249

*Primary Examiner*—Steven L. Stephan

[57] ABSTRACT

These three new types of leveling instruments do not rely on spirit-level-bubbles in glass vials used in dumpy-levels and in tilting-levels, nor on the so called self-leveling pendulums used in the automatic levels. These new types of leveling instruments use a free mercury surface as a mirror to assure that the line of sight through the center of the cross hairs is horizontal, or has a very small but constant inclination from the true horizontal for all pointings to the leveling rods. In the most precise model, the mercury surface is used to autocollimate the line of sight through the center of cross hairs to be horizontal for every pointing. In the less elaborate models, the mercury surface is used to guarantee that the line of sight through the center of cross hairs has only a very small but constant inclination with the true horizontal. It is important that this inclination stays constant, and it can be adjusted to be less than one tenth of one second of arc if so desired. The mercury levels itself correctly with great precision and consistency, and it has a superior performance if compared to hanging pendulums with friction, or to bubbles with surface tension in level vials, and therefore using mercury as described in this disclosure in leveling instruments will produce better leveling instruments.

1 Claim, 6 Drawing Figures

MERCURY LEVELING INSTRUMENT, SIDE VIEW.

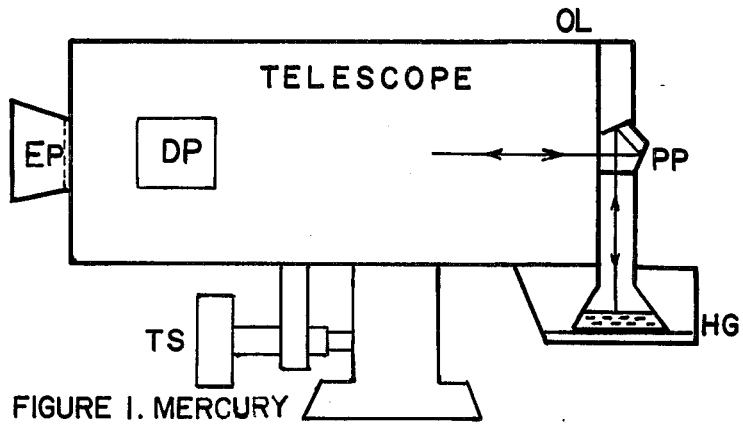
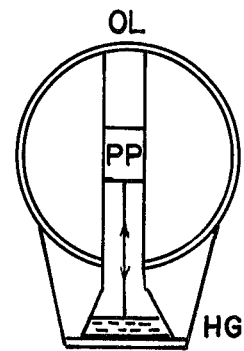
FIGURE 1. MERCURY LEVELING INSTRUMENT, SIDE VIEW.
FIGURE 2. MERCURY LEVELING INSTRUMENT, FRONT VIEW.
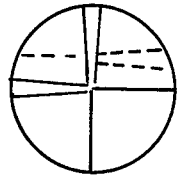
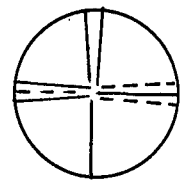
FIGURE 3. CROSS HAIRS NOT IN COINCIDENCE.
FIGURE 4. CROSS HAIRS IN COINCIDENCE.
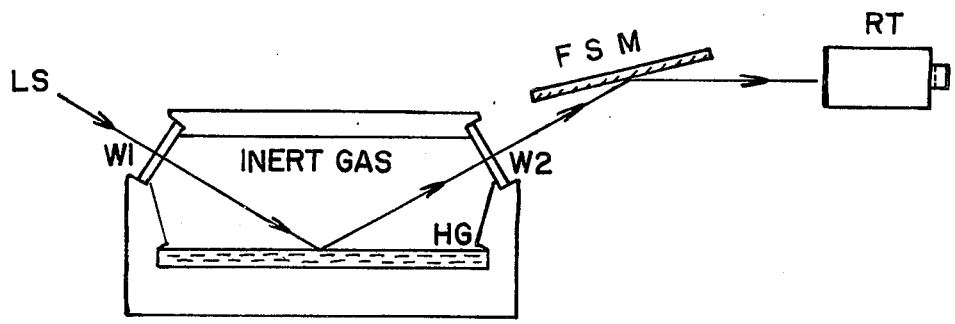
FIGURE 5. MERCURY LEVELER WITH A SINGLE REFLECTION.
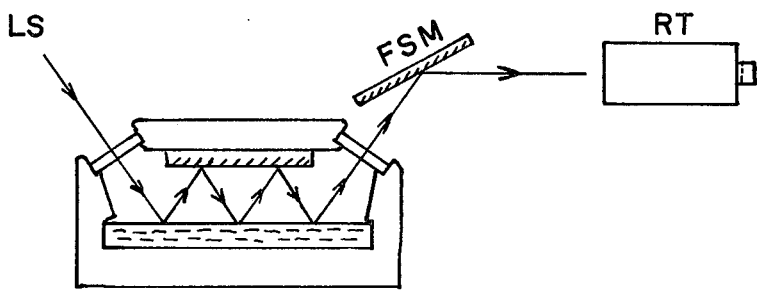
FIGURE 6. MERCURY LEVELER WITH MULTIPLE REFLECTIONS.

MERCURY LEVELING INSTRUMENTS

SPECIFICATION AND DESCRIPTION OF MERCURY LEVELING INSTRUMENT WITH AUTOCOLLIMATION

The main optics of the telescope of the new leveling instrument are similar to conventional leveling instruments, except for three new additions.

Firstly, the eyepiece EP, FIG. 1, has an autocollimating feature. Autocollimating eyepieces are commercially available but they have not been used in leveling observations.

Secondly, in front of the objective lens OL, FIGS. 1 and 2, blocking a part of the objective lens, (center portion in FIGS. 1 and 2; it could also be another part of it such as the left, or right half), there is a pentaprism PP, (which could be a front surface mirror at 45° angle blocking a portion of the objective lens; or it could be a half-mirror covering a part, or all of the objective lens), and directly under it, there is a free mercury surface HG in a container with proper damping and with an inert gas over the mercury preventing the oxidation and contamination of the mercury. Autocollimation like this has never been used in a leveling instrument.

Thirdly, the telescope has (this feature is not vital) a Dove prism DP, FIG. 1, or a set of reflecting surfaces accomplishing the same function, which rotates the image of the leveling rod by 90° of arc. Then the image of the vertical leveling rod will be seen through the telescope as horizontal. This will increase the reading accuracy of the level rod because the human eye can detect small deviations in the pointing more accurately in the horizontal direction than it can detect in the vertical direction as many studies on the vision of the human eye have shown. Taking advantage of this peculiarity of the human eye has never before been applied to leveling instruments. This same 90° rotation feature could also be added to the telescope of other leveling instruments such as tilting and automatic levels.

In addition to the described components, in front of the pentaprism there is the conventional plane-parallel-plate which is a standard component in the best leveling instruments at present, but it is not included in FIG. 1 because it is nothing new.

FIG. 1 is a side view of the instrument with portions cut away.

FIG. 2 shows the front view of the Mercury Leveling Instrument with Autocollimation (omitting the plane-parallel-plate). Pentaprism PP blocks the center part of the objective lens.

FIG. 3 shows the field of view through the telescope with the autocollimating eyepiece EP when the line of sight is not exactly horizontal.

FIG. 4 shows the field of view with the line of sight adjusted to horizontal.

FIG. 5 shows an embodyment of the instrument with a single reflection from the mercury surface.

FIG. 6 shows an embodyment of the instrument with a plurality of reflections from the mercury surface.

In FIG. 3 the cross pairs are shown in solid lines, and their reflected image from the mercury surface in dotted lines for clarity. When the tilting screw TS, FIG. 1, is rotated in or out, the telescope together with the pentaprism PP will tilt down or up, and the reflected image of the cross hairs will move towards or away from the cross hairs. When the image of the cross hairs is coincided with the cross hairs as seen in FIG. 4, the line of sight is horizontal assuming a perfect pentaprism PP. If the 90° image rotation by DP is used, FIGS. 3 and 4 should also be rotated by 90°. The reflected image of the vertical cross hair is omitted in FIGS. 3 and 4 for clarity. The focusing to the mercury surface is at infinite focus, and the focusing to the leveling rods is for shorter distances, normally for distances of 10 meters to 50 meters. To account for this focusing distance difference, an optical element of small negative diopter must be added, or an existing optical element may be partially changed in the ray path to the mercury surface. This will provide a separate focusing of a small range for the autocollimated image of the cross hairs so that the leveling rod and the cross hairs will be in sharp focus simultaneously. When the cross hairs are in coincidence as in FIG. 4, the line of sight through the center of cross hairs is horizontal because a part of its is perpendicular to the free and horizonal mercury surface. This is the highly desirable situation, and it is then time to observe the level rod. The described invention will produce this situation where the line of sight through the center of the cross hairs is reliably horizontal for all pointings with great consistency.

SPECIFICATION AND DESCRIPTION OF MERCURY LEVELING INSTRUMENT WITHOUT AUTOCOLLIMATION

A Mercury Leveler is solidly attached to the telescope of the leveling instrument -it could occupy the same space as the spirit level vial and its own reading telescope occupy in a tilting level, or it could be above or under the telescope. A Mercury Leveler uses a free mercury surface as a mirror; it may have a mirror solidly attached to its housing as in FIG. 6; it has a front-surface-mirror FSM, or another reflecting surface, and a reading telescope RT, see FIGS. 5 and 6. The image by the reading telescope RT may be brought into the eyepiece of the main telescope. The Mercury Leveler can use a single reflection from the mercury surface as in FIG. 5, or it can use multiple reflections (with it any reasonable number of reflections can be used) as in FIG. 6 for increased sensitivity. In FIGS. 5 and 6 LS is a light source - normal daylight is sufficients; W1 and W2 are windows in the mercury container. In FIG. 6, there is a plane-front-surface-mirror attached to the housing of the mercury container directly above the mercury surface making the multiple reflections possible. The number of multiple reflections is determined by the steepness of the ray of light from LS to the mercury surface. Mirror FSM directs the reflected ray into the reading telescope RT. One way to provide adjustment for the horizontality of the line of sight through the center of cross hairs of the main telescope is to have a fine motion adjustment for tilting the FSM mirror.

In both models, one shown in FIG. 5, and the other in FIG. 6, the reading telescope can have cross hairs in the focal plane of its eyepiece lens. This reading telescope RT is focused on the window W1 which also has a suitable target, or engraved cross hairs. It could also have an autocollimating eyepiece when window W1 would have to be a mirror.

When the main telescope of the leveling instrument is tilted up or down by turning the tilting screw like TS in FIG. 1, the cross hairs of RT will be on the target on the window W1 (or in autocollimation if W1 is a mirror) whenever the line of sight through the center of cross hairs of the main telescope of the leveling instrument has the same and constant inclination with the true horizontal direction. This inclination can be adjusted to be less than one second of arc if desired, and it will then remain constant with great reliability which is important. After the adjustment is done, the new instrument is ready for precise and reliable leveling observations.

I claim:

1. A leveling instrument having a telescope with an autocollimating eyepiece, a ninety degree image rotating means for rotating the image ninety degrees, a free horizontal mercury surface, a set of cross hairs, means for deflecting a light beam ninety degrees, and a tilting screw, said horizontal mercury surface reflecting surface, eyepiece, cross hairs, and deflecting means being aligned such that a user can see the cross hairs directly through the eyepiece and a reflection of these cross hairs from the horizontal mercury surface, said tilting screw adjusting the level of the telescope such that the direct view of the cross hairs and their reflection can be brought into registration assuring that the telescope is level, said image rotating means being rotatable such that a vertical leveling rod can be seen as horizontal.

* * * * *